US008207626B1

(12) United States Patent  (10) Patent No.: US 8,207,626 B1
Groves  (45) Date of Patent: Jun. 26, 2012

(54) DEVICE FOR ACTIVATING A VEHICLE ODOMETER USING AN EXTERNAL POWER SOURCE

(76) Inventor: Peter Douglas Groves, Pickerington, OH (US)

( * ) Notice: Subject to any disclaimer, the term of this patent is extended or adjusted under 35 U.S.C. 154(b) by 477 days.

(21) Appl. No.: 12/353,328

(22) Filed: Feb. 11, 2009

(51) Int. Cl.
 *B60R 16/03* (2006.01)
(52) U.S. Cl. ...................................................... 307/10.1
(58) Field of Classification Search .................. 307/10.1
 See application file for complete search history.

(56) References Cited

U.S. PATENT DOCUMENTS

| | | | | | |
|---|---|---|---|---|---|
| 4,617,472 | A | * | 10/1986 | Slavik ............................. | 307/9.1 |
| 4,701,867 | A | * | 10/1987 | Bruggemann ..................... | 703/8 |
| 5,027,640 | A | * | 7/1991 | Hinckley et al. ............... | 73/1.37 |
| 5,040,407 | A | * | 8/1991 | Hinckley et al. ............... | 73/1.37 |
| 5,050,080 | A | * | 9/1991 | Abe ................................ | 701/35 |
| 5,160,852 | A | * | 11/1992 | Charles et al. .................. | 307/77 |
| 5,302,857 | A | * | 4/1994 | Charles et al. .................. | 307/20 |
| 5,459,660 | A | * | 10/1995 | Berra ............................. | 701/33 |
| 5,541,840 | A | * | 7/1996 | Gurne et al. ..................... | 701/33 |
| 5,629,680 | A | * | 5/1997 | Makhija ........................ | 340/664 |
| 5,935,180 | A | * | 8/1999 | Fieramosca et al. ............ | 701/29 |
| 6,294,845 | B1 | * | 9/2001 | Yoshida et al. .............. | 307/10.6 |
| 6,407,554 | B1 | * | 6/2002 | Godau et al. .................. | 324/503 |
| 7,138,729 | B2 | * | 11/2006 | Bailey ............................. | 307/45 |
| 7,145,788 | B2 | * | 12/2006 | Plummer ....................... | 363/141 |
| 7,191,040 | B2 | * | 3/2007 | Pajakowski et al. ............. | 701/1 |
| 7,282,811 | B2 | * | 10/2007 | Niska et al. ................. | 307/10.7 |
| 7,462,952 | B2 | * | 12/2008 | Bailey ............................ | 307/9.1 |
| 7,687,935 | B2 | * | 3/2010 | Bailey ............................ | 307/9.1 |
| 7,701,080 | B2 | * | 4/2010 | Belanger et al. ............. | 307/10.1 |
| 7,830,117 | B2 | * | 11/2010 | Ambrosio et al. ............ | 320/109 |
| 2003/0060953 | A1 | * | 3/2003 | Chen .............................. | 701/33 |
| 2004/0018398 | A1 | * | 1/2004 | Kim ................................ | 429/9 |
| 2006/0036355 | A1 | * | 2/2006 | Schaar et al. .................... | 701/1 |
| 2007/0156311 | A1 | * | 7/2007 | Elcock et al. .................. | 701/29 |
| 2008/0086246 | A1 | * | 4/2008 | Bolt et al. ...................... | 701/29 |
| 2008/0100140 | A1 | * | 5/2008 | Sorenson et al. .............. | 307/40 |
| 2010/0093268 | A1 | * | 4/2010 | McCall et al. ............... | 454/119 |

* cited by examiner

*Primary Examiner* — Adi Amrany
(74) *Attorney, Agent, or Firm* — Jason H. Foster; Kremblas & Foster

(57) ABSTRACT

A device and method for activating the electronic odometer of a vehicle without using an electrical power source residing on the vehicle. The device is housed in a portable case and includes an electrical power source, a load circuit for connecting the power source to the electrical system of a vehicle, and a fault protection circuit that is electrically in parallel with the load circuit for protecting the vehicle and the device from damage that could otherwise result from a short circuit in the vehicle's electrical system. The method includes a series of steps that involve connecting electrical power to the vehicle's computer and various electrical subsystems in a predefined order.

22 Claims, 9 Drawing Sheets

DEVICE FOR ACTIVATING A VEHICLE ODOMETER USING AN EXTERNAL POWER SOURCE

CROSS-REFERENCES TO RELATED APPLICATIONS (Not Applicable)

STATEMENT REGARDING FEDERALLY-SPONSORED RESEARCH AND DEVELOPMENT (Not Applicable)

REFERENCE TO AN APPENDIX (Not Applicable)

BACKGROUND OF THE INVENTION

1. Field of the Invention

This invention relates generally to vehicle electrical and electronic devices and more particularly to a device and a method for activating the electronic odometer of an vehicle without drawing electrical power from the vehicle's electrical system.

2. Description of the Related Art

The accumulated mileage of a vehicle, and automobile's and motorcycles in particular, is a primary factor in determining the remaining useful life, and therefore the value, of the vehicle. In past decades, many vehicles featured mechanical odometers having a series of numbered wheels for recording and displaying an accumulated mileage on the vehicles' dashboards. The mileage displayed by such mechanical odometers typically remains visible and accurate irrespective of whether a vehicle's engine or electrical system is on or off.

In recent years, mechanical odometers have largely been replaced by electronic odometers that require power from a vehicle's electrical system to display an electronically stored mileage on a screen or other electronic readout. Generally, power is supplied to the electronic odometer of a vehicle when the vehicle's ignition switch is in either a first or second ignition position, or when a "trip" button on the vehicle's dashboard is depressed. When an electronic odometer is not receiving power from a vehicle's electrical system (i.e., when the ignition switch is not in the proper position, when the battery is dead, or when power cannot be delivered to the odometer for some other reason, such as damage to the electrical system) the mileage display is typically blank.

A problem commonly associated with vehicles that employ electronic odometers is that it can be difficult or prohibitively expensive to verify the accumulated mileage of such a vehicle if the vehicle's keys are not available, or if the vehicle's electrical system has been damaged to the extent that it is no longer able to deliver power to the odometer. This problem is of particular concern in the context of automobile auctions, in which large numbers of damaged vehicles are supplied by insurance companies and other suppliers for resale to dealers or other prospective buyers.

Attendees at automobile auctions (either in-person or online via the internet) generally have a limited amount of time to browse an auction's vast inventory in order to determine which vehicles are of interest, and to approximate the value of each of those vehicles. To facilitate efficient browsing and valuation, auctions will typically provide prospective buyers with documentation regarding a vehicle's specifications as well as photographic evidence of an automobile's accumulated mileage (i.e., a photograph of the automobile's dashboard with the odometer displaying the mileage).

If an auction is not able to provide evidence of an automobile's mileage, the auction will generally have to sell the automobile at a heavily reduced price in order to justify the risk assumed by a buyer that the mileage of the automobile is higher than would normally be expected given the age of the vehicle. Moreover, the unverified mileage of an automobile must be noted on the automobile's title which decreases the downstream value of the automobile and promotes fraudulent misrepresentation of the automobile's mileage. In cases where the mileage of a vehicle cannot be readily ascertained because of damage to the vehicle (as opposed to a missing key or a dead battery) the buyer also assumes the risk that there may be significant damage to the internal components of the automobile, such as the automobile's computer or other electrical components that are costly to repair or replace. Such damage may not be readily apparent upon casual inspection of the automobile, especially in the online context where prospective buyers must rely entirely upon pictures that the auction chooses to present.

It would therefore be advantageous to have an apparatus and a method for determining the accumulated mileage of an automobile having an electronic odometer without requiring power from the automobile's electrical system. It would further be advantageous to have such an apparatus and method that could be implemented quickly and without significant disassembly or modification of the automobile. It would further be advantageous to have such an apparatus that is highly portable.

BRIEF SUMMARY OF THE INVENTION

The invention is a device and a method for activating an electronic odometer of an automobile (as well as other vehicles featuring electronic odometers, such as motorcycles) without using a power source residing on the automobile, such as the automobile's battery or other electrical power source from which the electronic odometer draws power during normal operation of the automobile. The device is preferably housed in a lightweight, portable, watertight case and includes an electrical power source (preferably a conventional 12V battery) that is electrically connected to a load circuit and a fault protection circuit that are electrically in parallel with one another.

The load circuit of the device preferably includes at least two output receptacles for connecting the electrical power source of the device to the electrical system of an automobile. A first of the output receptacles is configured to be connected to the data link connection (DLC) port of an automobile by a specially configured cable extending therebetween for establishing an electrical connection between the device and the automobile's computer.

A second of the device's output receptacles is configured to be connected to a fuse panel of an automobile by a specially configured cable having at least one, and preferably two electrical leads extending therefrom. The leads preferably terminate in conventional electrical probes for connection to various fuse sockets within the fuse panel. The load circuit further includes a conventional control relay that is electrically connected in series intermediate the power source and the output receptacles of the device. The control relay allows the electrical connection between the power source and the output receptacles to be opened and closed (i.e., through latching and unlatching of the relay) in response to the application of current to a control input on the control relay.

The fault protection circuit of the device includes a trigger module that is electrically connected in series intermediate the power source and the control relay for switchably controlling the electrical connection between the electrical power source and the relay in response to a trigger input on the trigger module. A hand-held trigger switch is connected to the trigger module by an elongated cable for allowing a user to manually actuate the trigger input.

The fault protection circuit further includes a current-limiting circuit that is electrically connected in series intermediate the power source and the trigger module. The current-limiting circuit preferably includes a potentiometer and a capacitor that are electrically in parallel with one another. When the device is initially powered on, the current-limiting circuit allows the control relay to draw an actuating current (i.e., a current that is sufficient to initially latch the control relay) while the capacitor charges. Once the capacitor is charged, the potentiometer thereafter limits the current in the fault protection circuit to a predetermined maximum value that is greater than the holding current of the control relay (i.e., a current that is sufficient to keep the control relay latched). If the current in the load circuit exceeds a predetermined value (i.e., a "fault current"), such as if there is a short circuit in the electrical system of an automobile, the current in the fault protection circuit falls below the holding current. The control relay thus unlatches and interrupts the electrical connection between the power source and the output receptacles. Damage that would otherwise result from a persistent overcurrent condition in the circuitry of the automobile or the device is thereby mitigated.

The device preferably also includes a shock sensor that is electrically connected to the trigger module. If the shock sensor detects movement of the device when the device is powered on, the shock sensor will send a pulse of electrical current to the trigger module, thereby signaling the trigger module to interrupt the electrical connection between the current-limiting circuit and the control input of the control relay. The control relay is thereby caused to unlatch and interrupt the electrical connection between the power source and the output receptacles. Thus, if the case is moved while the probe leads are still connected to the device and the probes are hot, and the probes are thereby accidentally brought into contact with a delicate conductive surface, such as the exterior finish of an automobile, the deactivation of the device upon movement prevents electrical damage to the conductive surface that could otherwise result from electrical arcing from or between the probes.

The device preferably further includes a slow-blow type circuit breaker that is electrically connected in series intermediate the power source and the control relay. The circuit breaker provides back-up circuit protection in case the current-limiting circuit fails to shut the device down when current in the load circuit exceeds the fault current. Additionally, the circuit breaker prevents unintentional depletion of the device's battery, such as would otherwise occur if an operator unintentionally left the device connected to a relatively large load (i.e., a load larger than the amperage rating of the circuit breaker but less than the fault current) for an extended period of time (e.g., if the operator becomes distracted and steps away from the device).

The device preferably further includes a light emitting diode (LED) that is electrically connected intermediate the control relay and the output receptacles for indicating that the device is powered on (i.e., when the control relay is latched).

In attempting to activate the electronic odometer of a target automobile, an operator first activates the device by depressing the trigger switch. The operator will preferably then connect the DLC output receptacle of the device to the DLC port of the automobile, thereby providing electrical power from the device's power source to the automobile's computer, as well as to any components of the automobile's electrical system that are electrically connected to the computer. If the odometer of the vehicle is resultantly activated, the operation is complete and the operator or another individual can record the mileage displayed by the odometer. Alternatively, if there is an electrical short in the automobile's computer or in any of the automobile's electrical components that draw electrical power through the computer, an overcurrent condition in the device's load circuit will cause the device to shut down.

If connecting the device to the DLC receptacle of the automobile did not result in activation of the automobile's odometer and did not cause the device to shut down, the operator leaves the device connected to the DLC port of the automobile. If connecting the device to the DLC receptacle of the automobile did cause the device to shut down, the operator disconnects the DLC cable from the DLC port of the automobile and again depresses the trigger switch of the trigger in order to reactivate the device.

Next, the operator opens the fuse panel of the target automobile and locates the instrument cluster fuse and removes the fuse from its socket. The operator then applies one of the device's probes to the vacant socket, thereby applying electrical power from the power source to the automobile's instrument cluster circuit as well as to other of the automobile's electrical components that normally draw power from the instrument cluster circuit. If the odometer of the vehicle is resultantly activated, the operation is complete and the operator can record the mileage displayed by the odometer. Alternatively, if there is an electrical short in the automobile's instrument cluster circuit or in any of the automobile's electrical components that draw electrical power from the instrument cluster circuit, an overcurrent condition in the device's load circuit will cause the device to shut down.

If connecting the device to the instrument cluster fuse socket of the automobile did not result in activation of the automobile's odometer and did not cause the device to shut down, the operator leaves the device connected to the instrument cluster fuse socket. If connecting the device to the instrument cluster fuse socket of the automobile did cause the device to shut down, the operator disconnects the probe from the instrument cluster fuse socket and again depresses the trigger switch of the trigger in order to reactivate the device.

Next, the operator locates the ignition fuse in the fuse panel of the automobile and removes the fuse from its socket. The operator then applies one of the device's probes to the vacant fuse socket, thereby applying electrical power from the power source to the automobile's ignition circuit and to other of the automobile's electrical components that normally draw power from the ignition circuit. If the odometer of the vehicle is resultantly activated, the operation is complete and the operator can record the mileage displayed by the odometer. Alternatively, if there is an electrical short in the automobile's ignition circuit or in any of the automobile's electrical components that draw electrical power from the ignition circuit, an overcurrent condition in the device's load circuit will cause the device to shut down.

If there is more than one ignition fuse, the operator repeats the above-described process of applying a probe to a fuse socket for each of the ignition fuses until the odometer is activated or until all of the ignition fuses have been exhausted.

It is therefore a first purpose of the present invention to provide a device for activating the electronic odometer of an automobile without drawing electrical power from the automobile's electrical system. It is a further purpose of the present invention to provide such a device that is highly portable. It is yet a further purpose of the present invention to provide such a device that is capable of detecting a short circuit condition in the electrical system of an automobile and that will cease providing electrical power to the electrical system in response to such a condition. It is yet a further purpose of the present invention to provide such a device that can be manually operated by a handheld trigger. It is yet a further purpose of the present invention to provide a method for activating the electronic odometer of an automobile without drawing electrical power from the automobile's electrical system. It is yet a further purpose of the present invention to provide such a method that further includes detecting a short circuit condition in the electrical system of an automobile and interrupting electrical power to the electrical system in response to such a condition.

Figure 1:
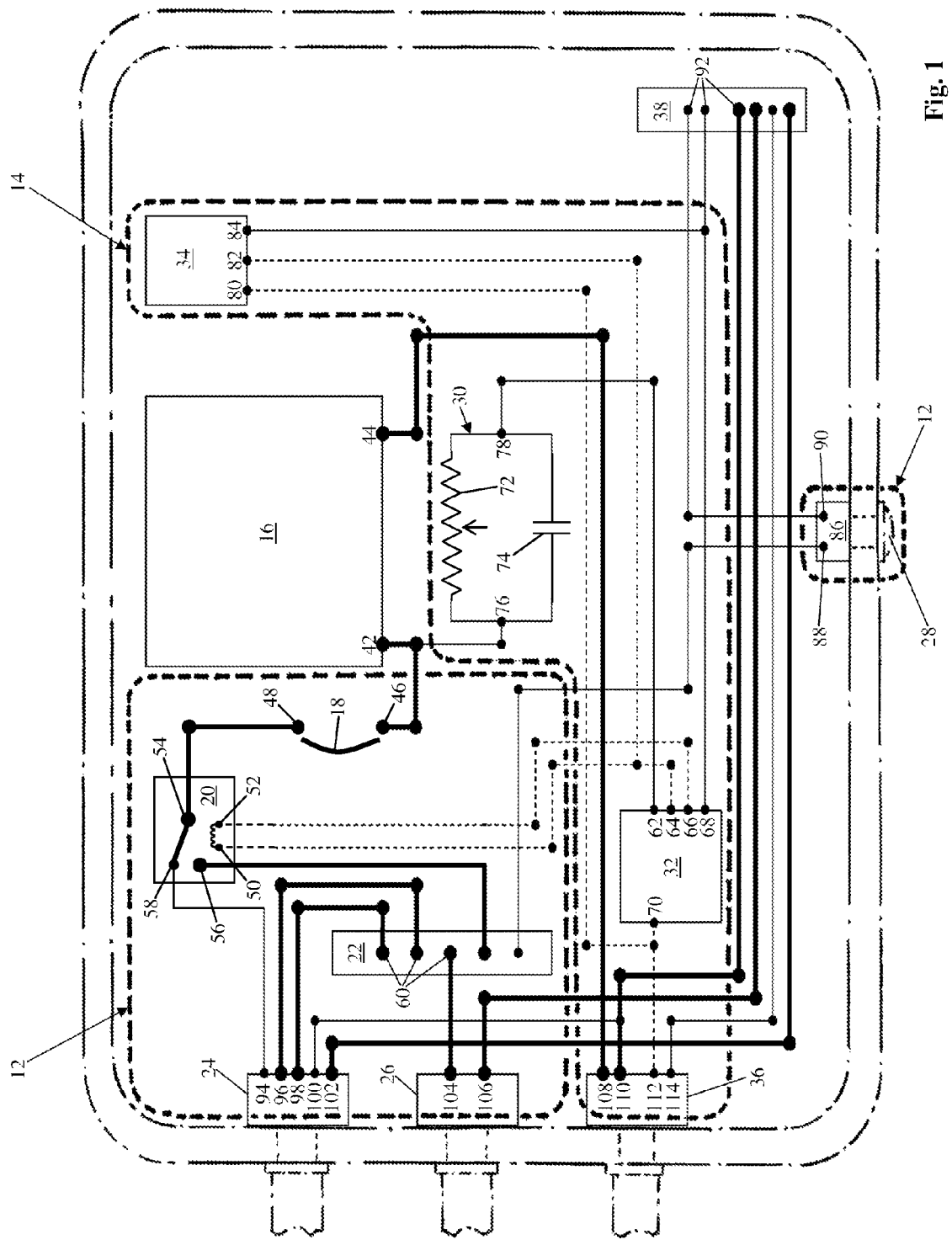
FIG. 1 is a schematic diagram illustrating the preferred embodiment of the present invention.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or terms similar thereto are often used. They are not limited to direct connection, but include connection through other elements where such connection is recognized as being equivalent by those skilled in the art. In addition, many circuits are illustrated which are of a type which perform well known operations on electronic signals. Those skilled in the art will recognize that there are many, and in the future may be additional, alternative circuits which are recognized as equivalent because they provide the same operations on the signals.

DETAILED DESCRIPTION OF THE INVENTION

Referring to FIG. 1, a wire diagram representing a device for activating the electronic odometer of a vehicle, indicated generally at 10, is shown. Although the device 10 and a method of operating the device 10 are described herein as being used to activate the electronic odometer of an automobile, it is contemplated that the device 10 and the described method can be used to activate the electronic odometer of any other type of vehicle including, but not limited to, motorcycles. The phrases "activating the electronic odometer," "providing power to the odometer," and any other similar phrases used herein are defined to mean providing electrical power to any and all components of a vehicle's odometer, such as a display means and a mileage storage element (e.g., a memory chip or a hard drive), that normally require electrical power in order to display the accurate accumulated mileage of the automobile to an observer of the display means. Unless otherwise noted, all electrical connections described herein are made by using conventional insulated electrical conductors, such as insulated copper wires, that are capable of safely conducting at least 15 A for the high current connections described herein, and at least 5 mA for the low current connections described herein.

The device 10 is defined by a load supply circuit, indicated generally at 12, that is electrically in parallel with a fault protection circuit, indicated generally at 14. Electrical power is supplied to both circuits by a battery 16. The load supply circuit 12 includes a circuit breaker 18, a control relay 20, a terminal strip 22, a probe/charger receptacle 24, a data link connection (DLC) receptacle 26, and a light emitting diode (LED) 28. The fault protection circuit 14 includes a current-limiting circuit 30, a trigger module 32, a shock sensor 34, and a trigger receptacle 36. All of the electrical components of the device 10 are electrically connected to a grounded terminal strip 38. The entire device 10 is preferably housed in a portable case that is durable, lightweight, watertight, and nonconductive, such as the case 40 shown in FIG. 2.

Referring back to FIG. 1, the battery 16 is a conventional 12V 5 Ah rechargeable sealed lead acid battery of the type commonly found in many battery backup units that are used for providing uninterruptable electrical power to household and office electronic devices. The battery 16 has a positive terminal 42 and a negative terminal 44. The battery 16 is preferred for its combination of electrical capacity and lightweight portability, although it is contemplated that virtually any other type of suitable auxiliary electrical power source can alternatively be used in the device 10. The term "auxiliary" is defined herein to mean separate and apart from power sources that normally reside on an automobile, such as an automobile's battery, from which an automobile's electrical system normally draws power during operation. For example, it is contemplated that the battery 16 can be replaced by a variety of other types of batteries, such as a conventional 12V 40 Ah automobile battery, or, alternatively, a plurality of conventional 1.5V 12,000 mAh D batteries. It is further contemplated that the battery 16 can be replaced by a conventional AC/DC adapter and a power cord extending therefrom having a two or three prong plug for connecting the device 10 to a conventional electrical receptacle. Of course, a fuel cell or other electromechanical or electrochemical transducer could also be used.

The circuit breaker 18 is a conventional 10 A Bussman MINI Modified Reset Type 2 circuit breaker. The circuit breaker 18 has an input terminal 46 that is electrically connected to the positive terminal 42 of the battery 16, and an output terminal 48 that is electrically connected to the control relay 20 (described below). It is highly preferred that the circuit breaker 18 be a slow blow type circuit breaker for allowing an overcurrent condition in the circuit breaker 18 to persist for a finite, continuous amount of time (preferably in a range of about 10 seconds to about 1 minute) before the circuit breaker 18 trips.

Although the particular circuit breaker 18 described above has been shown to work well in the context of the device 10, it is contemplated that any other type or brand of slow blow circuit breaker or fuse assembly can alternatively be used. For example, the circuit breaker 18 can be replaced by a conventional two prong fuse socket having a conventional two-prong, slow blow, 10 A fuse mounted therein. While a circuit breaker having a rating of about 10 A is preferred, it is contemplated that a circuit breaker with a rating in a range of about 10 A to about 30 A can be substituted in the device as dictated by the load requirements of a particular application (described in greater detail below). It is further contemplated that the circuit breaker 18 can be entirely omitted from the device 10.

Still referring to FIG. 1, the control relay 20 is a conventional, single pole double throw (SPDT) 12V 20 A micro ISO automotive relay. The control relay 20 has a positive coil input terminal 50 and a negative coil input terminal 52 that are electrically connected to the trigger module 32 (described below). A high current input terminal 54 is electrically connected to the output terminal 48 of the circuit breaker 18, a high current output terminal 56 is electrically connected to the terminal strip 22 (described below), and a low current charger terminal 58 is electrically connected to the probe/charger receptacle 24 (described below).

As will be understood by those skilled in the art, the control relay is capable of opening and closing a current path between the high current input terminal 54 and the high current output terminal 56 in response to a "control input." The term "control input," as it relates to the particular control relay 20, is herein defined as electrical current that is applied to the coil (not shown) of the control relay 20 (i.e., current that flows between the positive coil input terminal 50 and the negative coil input terminal 52 of the control relay 20). It is to be understood, however, that if the control relay is replaced by another suitable switching device (as further described below), the control input can alternatively be any another type of input or signal that is required to effectuate the switching capability described above as would be necessitated by such a device.

The control relay 20 has a preferred actuating current (i.e., a current that, when applied to the coil of the control relay 20, is sufficient to latch the control relay 20 and establish an internal electrical connection between the high current input terminal 54 and the high current output terminal 56) of about 100 mA. The control relay 20 has a preferred holding current (i.e., a current that, when applied to the coil of the control relay 20 after it has been latched initially, is sufficient to keep the control relay 20 latched) of about 50 mA. It is contemplated, however, that the actuating current and the holding current may be varied to suit a particular application.

Although the particular control relay 20 described above has been shown to work well in the context of the device 10, it is contemplated that any other brand or type of suitable relay can alternatively be used. For example, it is contemplated that the control relay 20 can be replaced by a conventional electromechanical relay, or a solid state relay of a different type, such as a single pole single throw (SPST) relay.

The terminal strip 22 is a conventional 20 A terminal strip 22 that is used to conveniently distribute electrical power from the high current output terminal 56 of the control relay 20 to a plurality of output terminals 60. The output terminals 60 of the terminal strip 22 are electrically connected to the probe/charger receptacle 24, the DLC receptacle 26, and to the LED 28, all of which are described in greater detail below.

Although a conventional terminal strip 22 is preferred for its low cost and commercial availability, it is contemplated that the terminal strip 22 can be replaced by any other type of suitable electrical bus component, such as a conventional busbar or a segment of conductive wire that is capable of distributing input power to several output lines. It is further contemplated that the terminal strip 22 can be omitted, and that the receptacles 24 and 26 and the LED 28 can be connected directly to the high current output terminal 56 of the control relay 20.

The trigger module 32 is a conventional universal trigger output module of the type commonly found in automotive remote-start, alarm, and audio/video systems. A trigger module that has been found to work particularly well is a commercially available TR-7 solid state 12V Universal Trigger Output Module from PAC, which was selected for its low power consumption and multi-use reliability.

The trigger module 32 has a low current power input 62 that is electrically connected to the current-limiting circuit 30 (described below), a positive low current trigger-controlled output 64 that is electrically connected to the positive coil input 50 of the control relay 20, a negative low current trigger-controlled output 66 that is electrically connected to the negative coil input 52 of the control relay 20, a low current ground input 68 that is electrically connected to the grounded terminal strip 38, and a low current trigger input 70 that is electrically connected to the trigger receptacle 36 (described below). When the trigger module 32 is receiving continuous power on its low current power input 62, a pulse of current on the low current trigger input 70 of the trigger module 32 will cause the trigger module 32 to toggle between a "standby" mode, in which an internal electrical connection between the positive and negative low current trigger controlled outputs 64 and 66 is open, and an "on" mode, in which an internal electrical connection is established between the positive and negative low current trigger controlled outputs 64 and 66 of the trigger module 32.

Although the particular trigger module 32 described above has been shown to work well in the context of the device 10, it is contemplated that virtually any commercially available or custom built multi-relay device that can provide the switching capability of the trigger module 32 (as further described below) can alternatively be used in the device 10. It is further contemplated that any conventional mechanical, electromechanical, or electronic switching device, such as a microcontroller or a programmable logic control (PLC), that is configured to provide the switching capability of the trigger module 32 can alternatively be used in the device 10.

Still referring to FIG. 1, the current-limiting circuit 30 includes a potentiometer 72 and a capacitor 74 that are electrically connected in parallel with one another. The potentiometer 72 is a conventional 100 Ohm 5 W rotary potentiometer, and the capacitor 74 is a conventional 220MFD 25V tubular axial capacitor. The current-limiting circuit 30 has a low current input 76 that is electrically connected to the positive terminal 42 of the battery 16, and a low current output 78 that is electrically connected to the low current power input 62 of the trigger module 32.

Although the rotary potentiometer 72 described above is preferred for use in the current-limiting circuit 30, it is contemplated that the potentiometer 72 can be replaced by various different types of variable resistors, non-variable resistors, potentiometers, or rheostats for achieving similar functionality as will be described in greater detail below. Similarly, it is contemplated that the capacitor 74 can be replaced by various other types of capacitors, such as various different electrolytic capacitors, basic parallel plate capacitors, or mechanical variable capacitors for achieving similar functionality.

The shock sensor 34 is a conventional adjustable sensitivity shock sensor of the type commonly found in automotive alarm systems. The particular sensor in the preferred embodiment of the device 10 is a Clifford DEI 504C Matrix Dual Stage Shock Sensor, which was selected for its compact size and light weight. The shock sensor 34 has a negative output contact 80 that is electrically connected to the low current trigger input 70 of the trigger module 32, an input power contact 82 that is electrically connected to the positive low current trigger-controlled output 64 of the trigger module 32, and a ground contact 84 that is electrically connected to the grounded terminal strip 38.

Although the particular shock sensor 34 described above has been shown to work well in the context of the device 10, it is contemplated that any type or brand of commercially available or custom fabricated shock sensor 34, or similar component that is capable of detecting movement of the device 10 and outputting an electrical signal in response to such movement, can alternatively be used in the device 10. For example, it is contemplated that a component shock sensor from a commercially available Viper or Cobra brand automotive alarm system can be used in place of the shock sensor 34 described above. It is further contemplated that a conventional accelerometer with a motion triggered output signal can be substituted for the shock sensor 34. Still further, it is contemplated that the shock sensor 34 can be entirely omitted from the device 10.

The LED 28 is a conventional 12V red LED that is seated in a conventional LED socket 86. The LED socket 86 has a positive low current input terminal 88 that is electrically connected to the terminal strip 22, and a negative low current input terminal 90 that is electrically connected to the grounded terminal strip 38. Referring to FIG. 1, the LED socket 86 is mounted to the interior of the case 40 and the LED 28 protrudes through an aperture formed in a sidewall of the case 40. The LED 28 is thus clearly visible to those observing the exterior of the sidewall of the case 40.

Although the LED 28 is red in color, it is contemplated that the LED 28 can be any color desired, such as white, green, blue, yellow, or orange. It is further contemplated that the LED 28 can alternatively be positioned to protrude through various different surfaces of the case 40, or that additional LEDs can be mounted to the case 40 for improved visibility from various different sides of the case 40. Still further, it is contemplated that various different alerting devices to signal an alert that can be perceived by humans, such as any light or sound emitting components or information displays, such as conventional incandescent light bulbs, electric or electronic buzzers, horns, or alarms, or analog or digital displays, can alternatively or additionally be incorporated into the device 10 for indicating the device's operational status as will be described in greater detail below.

The grounded terminal strip 38 is a conventional 20 A terminal strip similar to the terminal strip 22 described above. The grounded terminal strip 38 has a plurality of electrically interconnected terminals 92 that are used as electrical grounding points for the various components of the device 10. The terminals 92 of the grounded terminal strip 38 are electrically connected to the negative low current input terminal 90 of the LED 28, the low current ground input 68 of the trigger module 32, the trigger receptacle 36 (described below), the DLC receptacle 26 (described below), and the probe/charger receptacle 24 (described below).

Still referring to FIG. 1, the probe/charger receptacle 24 is a commercially available 5 pin, fixed receptacle sold by LEMO (model HGP.3S/P). The probe/charger receptacle 24 is mounted to the interior of the case 40 and is accessible through an aperture formed in a sidewall of the case 40. A first pin of the probe/charger receptacle 24 is a positive charger input contact 94 that is electrically connected to the low current charger terminal 58 of the control relay 20. Second and third pins of the probe/charger receptacle 24 are high current probe output contacts 96 and 98 that are electrically connected to the terminal strip 22. A fourth pin of the probe/charger receptacle 24 is a negative low current charger input contact 100 that is electrically connected to the grounded terminal strip 38. A fifth pin of the probe/charger receptacle 24 is a negative high current probe output contact 102 that is electrically connected to the grounded terminal strip 38.

The DLC receptacle 26 is a commercially available 2 pin, fixed receptacle sold by LEMO (model HGP.2S/P). The DLC receptacle 26 is mounted to the interior of the case 40 and is accessible through an aperture formed in a sidewall of the case 40. A first pin of the DLC receptacle 26 is a positive high current output contact 104 that is electrically connected to the terminal strip 22. A second pin of the DLC receptacle 26 is a negative high current output contact 106 that is electrically connected to the grounded terminal strip 38.

The trigger receptacle 36 is a commercially available 4 pin, fixed receptacle sold by LEMO (model HGP.3S/P). The trigger receptacle 36 is mounted to the interior of the case 40 and is accessible through an aperture formed in the sidewall of the case 40. A first pin of the trigger receptacle 36 is a high current system ground input contact 108 that is electrically connected to the negative terminal 44 of the battery 16. A second pin of the trigger receptacle 36 is a key controlled high current system ground output contact 110 that is electrically connected to the grounded terminal strip 38. A third pin of the trigger receptacle 36 is a trigger controlled low current ground contact 112 that is electrically connected to the low current trigger controlled input 70 of the trigger module 32. A fourth pin of the trigger receptacle 36 is a low current ground input contact 114 that is electrically connected to the grounded terminal strip 38.

Figure 2:
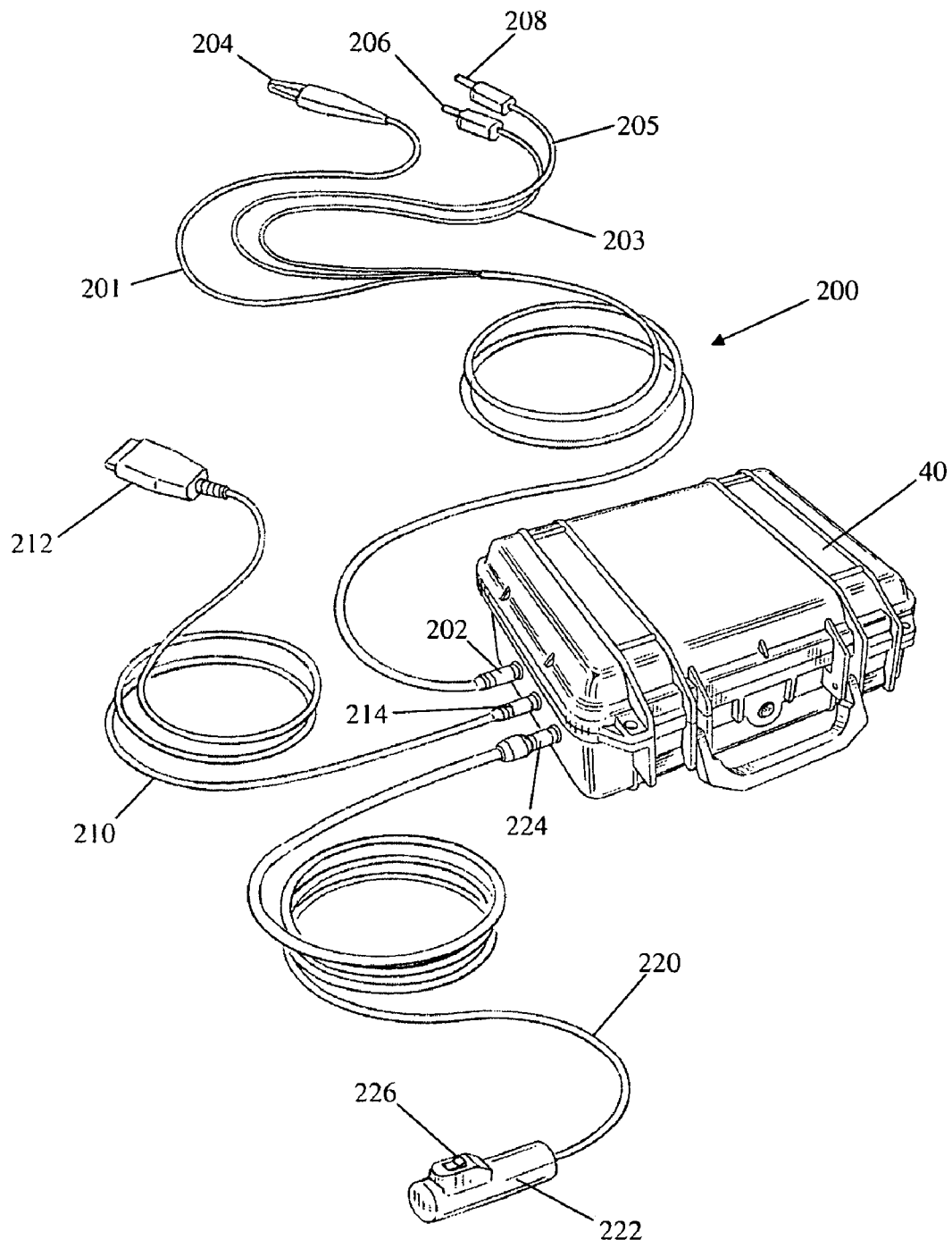
FIG. 2 is a perspective view illustrating the preferred embodiment of the present invention shown in FIG. 1 with the DLC cable, probe leads, and trigger cable operatively connected to the inventive device.

Referring now to FIGS. 1 and 2, three probe leads, indicated generally at 200, are provided for connecting the probe/charger receptacle 24 of the device 10 to the electrical system of an automobile and to an external grounded conductor (as will be described in greater detail below). A first end of each of the leads terminates in a commercially available 5 pin, straight plug 202 sold by LEMO (model FFA.3S) that matingly connects to the probe/charger receptacle 24 described above. Each of the leads 200 is electrically connected to a pin of the plug 202 (i.e., the three leads 200 are connected to three corresponding pins of the plug 202). A second end of each of the leads preferably terminates in a socket (not within view) that is suitable for attachment to a variety of different conventional electrical connectors, including, but not limited to, alligator clip probes, straight pin probes, crocodile clip probes, and plunger type probes, such as the alligator clip probe 204 and the straight probes 206 and 208. It is contemplated that a splitter or Y-connector can alternatively be attached to the socket of any of the probe leads 200 for facilitating the attachment of two electrical connectors to a single lead.

When the plug 202 of the probe leads 200 is connected to the probe/charger receptacle 24 of the device 10, a first of the probe leads 201 (preferably black in color) is electrically connected to the negative high current probe output contact 102 of the probe/charger receptacle 24, and a second and a third of the leads 203 and 205 (preferably both red in color) are electrically connected to the first and second high current output contacts 96 and 98 of the probe/charger receptacle 24, respectively. The probe lead 201 is therefore electrically grounded, and the leads 203 and 205 are electrically "hot" when the device 10 is powered on (as will be described in greater detail below).

A DLC cable 210 is provided for connecting the DLC receptacle 26 of the device 10 to the DLC port of an automobile (further described below). A first end of the DLC cable 210 terminates in a conventional 16 pin DLC plug 212, and a second end of the DLC cable 210 terminates in a commercially available 2 pin, straight plug 214 sold by LEMO (model FFA.3S) that matingly connects to the DLC receptacle 26 described above. A first pin of the straight plug 214 is electrically connected to the power pin of the DLC plug (commonly pin 16 with respect to the DLC port of most automobiles) and a second pin of the straight plug 214 is electrically connected to the ground pin of the DLC plug (commonly pin 4 with respect to the DLC port of most automobiles).

When the straight plug 214 of the DLC cable 210 is connected to the DLC receptacle 26 of the device 10, the first pin of the straight plug 214 is electrically connected to the positive high current output contact 104 of the DLC receptacle 26, and the second pin of the straight plug 214 is electrically connected to the negative high current output contact 106 of the DLC receptacle 26.

Still referring to FIG. 2, a trigger cable 220 is provided for connecting a conventional handheld trigger 222 to the trigger receptacle 36 of the device 10. The end of the trigger cable 220 opposite the handheld trigger 222 terminates in a commercially available 4 pin, straight plug 224 sold by LEMO (model FFA.3S) that matingly connects to the trigger receptacle 36 described above. A first pin and a second pin of the plug 224 are electrically connected to one another, and a third pin and a forth pin of the plug are electrically connected to a depressible, spring-loaded trigger switch 226 on the handheld trigger 222 via the trigger cable 220. When the trigger switch 226 is depressed, an internal electrical connection is established between the third pin and the forth pin of the plug (as will be described in greater detail below).

When the plug 224 of the trigger cable 220 is connected to the trigger receptacle 36 of the device 10, the first pin of the plug is electrically connected to the high current system ground input contact 108 of the trigger receptacle 36, the second pin of the plug is electrically connected to the key controlled high current system ground output contact 110 of the trigger receptacle 36, the third pin of the plug is electrically connected to the trigger controlled low current ground contact 112 of the trigger receptacle 36, and the fourth pin is electrically connected to the low current ground input contact 114 of the trigger receptacle 36.

Figure 3:
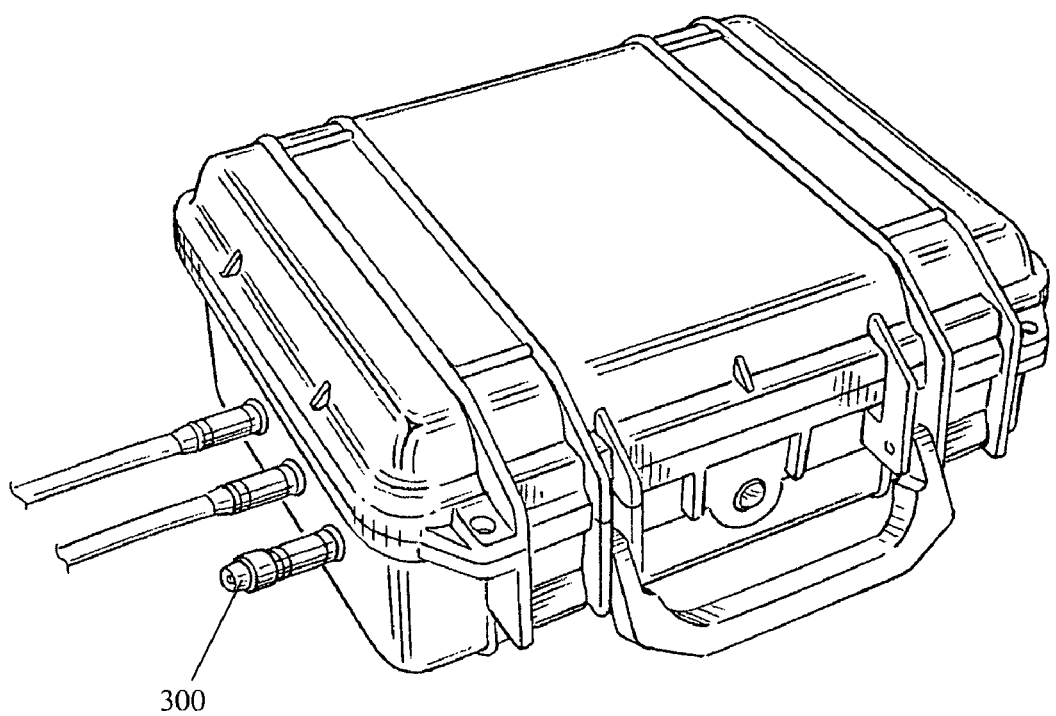
FIG. 3 is a perspective view illustrating the preferred embodiment of the present invention shown in FIG. 1 with a button stalk operatively connected to the inventive device.
Figure 4:
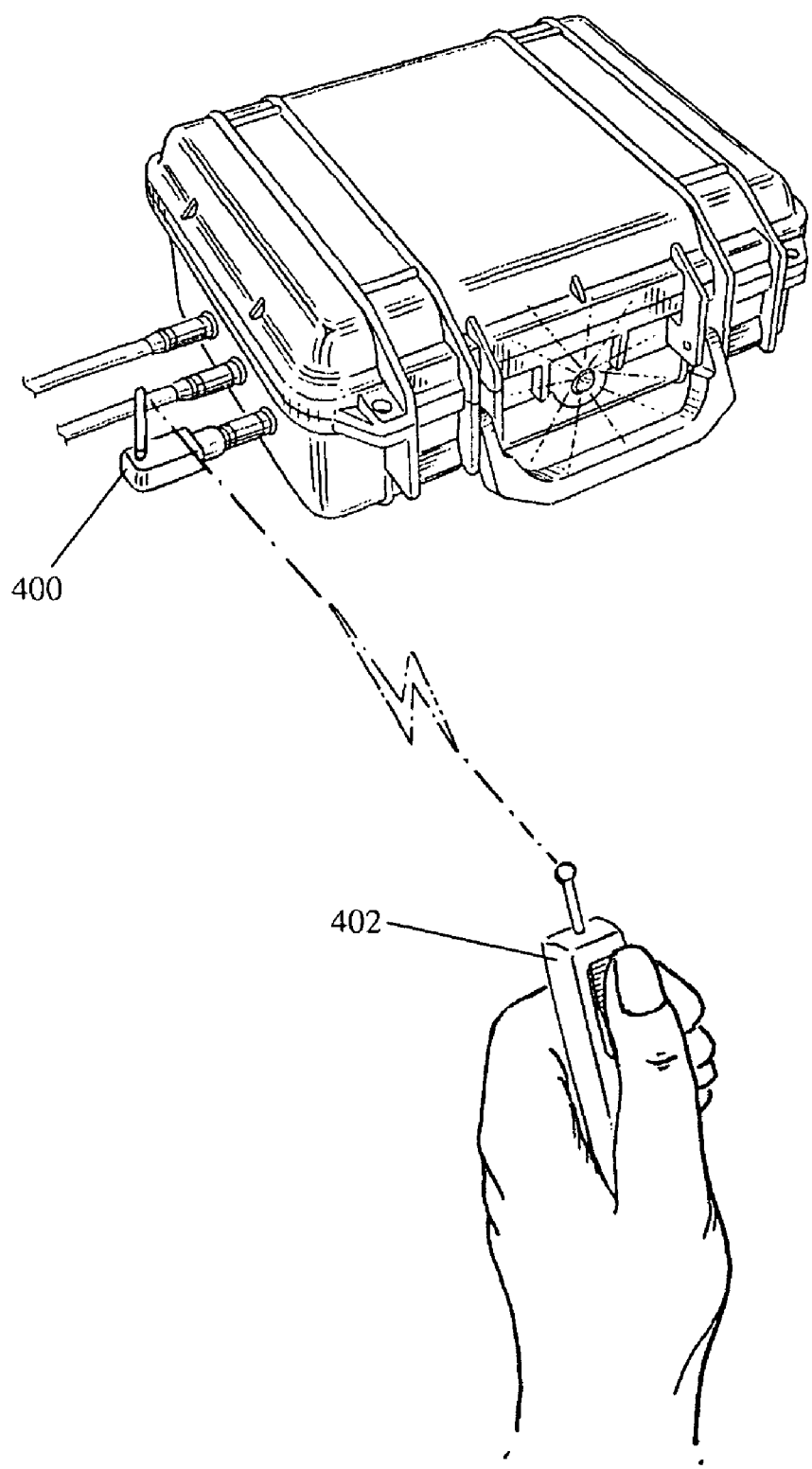
FIG. 4 is a perspective view illustrating the preferred embodiment of the present invention shown in FIG. 1 with a wireless control means operatively connected to the inventive device.

The handheld trigger 222 and trigger cable 220 allow an operator to conveniently operate the device 10 from a distance. It is contemplated that the handheld trigger 222 and trigger cable 220 can be replaced by a similarly configured trigger, switch, button, or similar control device, such as the button stock 300 shown in FIG. 3, that plugs directly into the trigger receptacle 36 with no cable therebetween. Referring to FIG. 4, it is further contemplated that a wireless electronic or electromechanical receiving unit, such as the unit 400, that is capable of establishing the electrical connections described above, can be plugged into the trigger receptacle 36 of the device 10, or can be internally incorporated into the device 10, and that a wireless handheld transmitting unit, such as the unit 402, can be used to actuate those connections via wireless communication, such as by radio frequency transmission, infrared signal, or Bluetooth connection.

Figure 5:
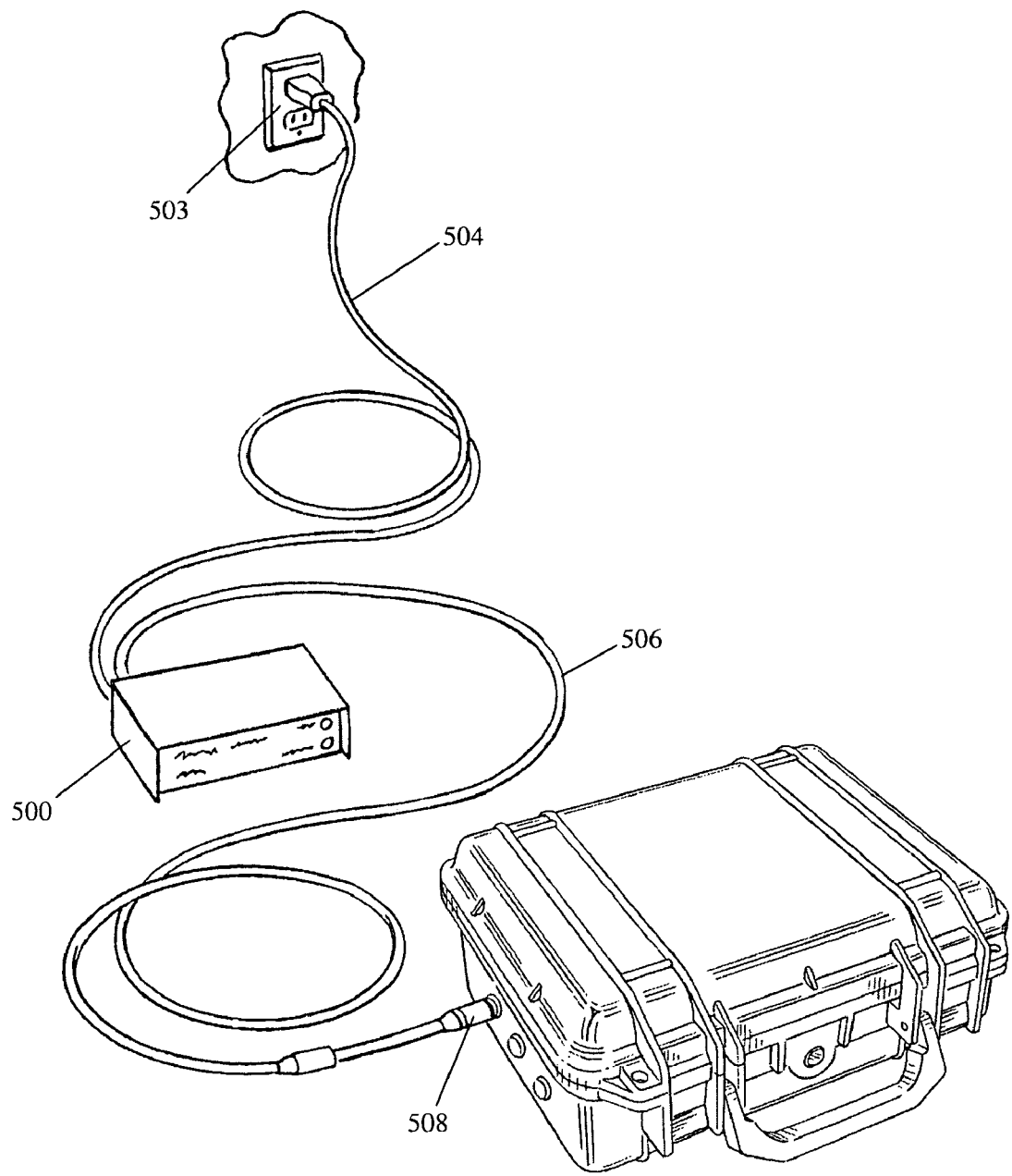
FIG. 5 is a perspective view illustrating the preferred embodiment of the present invention shown in FIG. 1 with the inventive device being charged.

Referring now to FIG. 5, a conventional 12V trickle charger 500 is provided for recharging the battery 16 of the device 10. The charger 500 includes a conventional 12V AC/DC adapter that can be electrically connected to a conventional electrical receptacle, such as wall outlet 503, by a conventional two or three prong power cable 504, and further includes a specialized charging cable 506 for electrically connecting the charger 500 to the device 10. The specialized charging cable 506 terminates on one end in a 5 pin, straight plug 508 sold by LEMO that is identical to the 5 pin lead plug 202 described above, and that similarly mates with the 5 pin probe/charger receptacle 24 of the device 10. A first pin of the plug 508 is electrically connected to a positive output line of the charging cable 506, and a second pin of the plug 508 is electrically connected to a negative output line of the charging cable 506. The remaining three pins of the plug are not used.

When the charging cable plug 506 is connected to the probe/charger receptacle 24 of the device 10, the first pin of the plug is electrically connected to the positive charger input contact 94 of the probe/charger receptacle 24, and the second pin of the plug is electrically connected to the negative charger input contact 100 of the probe/charger receptacle 24. Current is thus allowed to flow from the charger 500 to the battery 16 of the device 10 by way of the terminal strip 22, the control relay 20, and the circuit breaker 18, thereby charging the battery 16.

Although the particular trickle charger 500 described above has been found to work well in the context of the device 10, it is contemplated that any other suitable charging means can be employed for charging the battery 16 of the device 10. For example, it is contemplated that any one of a simple charger, a timer charger, an intelligent charger, or a fast charger can alternatively be used. It is further contemplated that the battery 16 can be removed from the device 10 and charged at a separate location, such as while a freshly charged battery 16 is installed in the device 10. It is further contemplated the charger 500 can be omitted and that conventional non-rechargeable batteries can be swapped in and out of the device 10 as needed.

Although the various receptacles and plugs described above have been found to work well in the context of the device 10 and the related components, it is contemplated that all other types of electrical receptacles, plugs, or connectors having suitable amperage ratings (>~15 A for high current contacts) and a requisite number of similarly connected pins can alternatively be used. It is preferred that all of the receptacles and plugs be liquid and dust resistant, and that they feature locking connections. It is further contemplated that the locations of the receptacles and the configurations of the various pins can be varied from the locations and configurations described above without departing from the spirit of the invention.

Before using the device 10 to verify the mileage of an automobile having an electronic odometer and a DLC port, an operator first verifies that the odometer is not receiving necessary electrical power (i.e., power necessary for activation) from a power source residing on the automobile, such as the automobile's battery, or any other electrical power source. The operator then plugs the trigger cable plug 224 into the trigger receptacle 36 of the device 10. The interconnected first and second pins of the plug 224 of the trigger cable (described above) thus establish an internal electrical connection between the high current system ground input contact 108 of the trigger receptacle 36 and the high current system ground output contact 110 of the trigger receptacle 36, thereby completing a current path between the negative terminal 44 of the battery 16 and the grounded terminal strip 38 and allowing current to flow from the positive terminal 42 of the battery 16 to the low current power input 62 of the trigger module 32. Upon receiving input power, the trigger module 32 is activated and enters a standby mode (described above) with a current draw of less than about 5 mA.

Next, the operator plugs the straight plug 214 of the DLC cable 210 into the DLC receptacle 26 of the device 10 and plugs the straight plug 202 of the probe/charger leads 200 into the probe/charger receptacle 24 of the device 10. After verifying that the probes 204, 206, and 208 are not in contact with each other or with any electrically conductive surfaces (e.g., the body of the automobile), the operator depresses and releases the trigger switch 226 of the handheld trigger 222, thereby momentarily establishing an internal electrical connection between the trigger controlled low current ground contact 112 of the trigger receptacle 36 and the low current ground input contact 114 of the trigger receptacle 36. A pulse of current is thus allowed to flow between the low current trigger controlled input 70 of the trigger module 32 and the grounded terminal strip 38, thereby toggling the trigger module 32 to an "on" mode (described above).

Upon being toggled on, the trigger module 32 establishes an internal electrical connection between the positive trigger controlled output 64 of the trigger module 32 and the negative trigger controlled output 66 of the trigger module 32, as described above. Current supplied to the trigger module 32 by the battery 16 is thus allowed to flow between the positive and negative trigger controlled outputs 64 and 66 of the trigger module 32 and the positive and negative coil input terminals 50 and 52 of the control relay 20, and from the positive trigger controlled output 64 of the trigger module 32 to the power input 82 of the shock sensor 34. The shock sensor 34 is thereby activated, and the coil of the control relay 20 is energized, thus latching the control relay 20 and establishing an internal electrical connection between the high current input terminal 54 of the relay and the high current output terminal 56 of the control relay 20.

As the coil of the control relay 20 draws an initial actuating current (described above), most or all of the current flows substantially unimpeded through the previously uncharged capacitor 74 of the current-limiting circuit 30, and little or no current flows through the potentiometer 72 of the current-limiting circuit 30 (i.e., the capacitor 74 acts like a short, as will be understood by those skilled in the art). As the capacitor 74 charges, the current flow through the capacitor 74 decays, and the current flow through the potentiometer 72 increases until substantially all of the current in the current limiting circuit 30 flows through the potentiometer 72 and little or no current flows through the capacitor 74 (i.e., the charged capacitor 74 acts like an open switch, as will be understood by those skilled in the art). It is therefore important that the capacitor 74 have a sufficiently long charging time (i.e., a sufficiently large capacity) to provide the control relay 20 with a sufficient amount of time to latch before the current in the current-limiting circuit 30 substantially diverts from the capacitor 74 to the potentiometer 72.

After the capacitor 74 is charged and the control relay 20 is latched, the resistance provided by the potentiometer 72 sets a lower limit to the current in the fault protection circuit 14 at a level that is greater than the holding current of the relay coil 20 (described above) by a predetermined amount, assuming that the fault protection circuit 14 is the only load on the battery 16. If an additional load is placed on the battery 16 that is in parallel with the fault protection circuit 14, such as by way of the load supply circuit 12, the current in the fault protection circuit 14 will drop in proportion to that load (i.e., the greater the load in the load supply circuit 12, the greater the current drop in the fault protection circuit 14).

If the load current in the load supply circuit 12 is large enough to cause the current in the fault protection circuit 14 to fall below the holding current of the control relay 20, the control relay 20 will unlatch (described in greater detail below). The resistance provided by the potentiometer 72 is therefore set (i.e., by an operator) to maintain a current level in the fault protection circuit 14 that is above the holding current of the control relay 20 until a predetermined "fault current" is exceeded in the load supply circuit 12. The current-limiting circuit 30 thereby performs in the manner of an "adjustable fuse" that can be tailored to suite varying load requirements. The fault current for the preferred embodiment of the invention is about 30 A, although it is contemplated that the fault current can be varied from about 1 A to about 40 A, depending on factors such as an anticipated load requirement and the amperage ratings of the various components and conductors of the device 10 and of the target automobile. In any case, the fault current should be lower than a current level that would cause damage to the device or to an automobile that is connected to the device.

Figure 9:
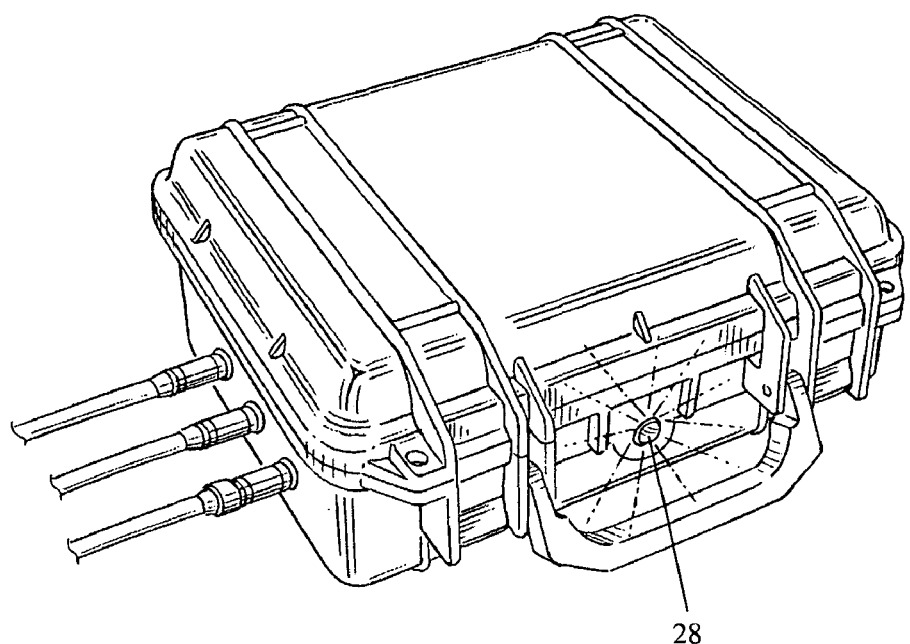
FIG. 9 is a perspective view illustrating the preferred embodiment of the present invention shown in FIG. 1 with the LED illuminated.

With the control relay 20 latched, a current path is established between the high current output terminal 56 of the control relay 20 and the terminal strip 22. This completes paths between the positive terminal 42 of the battery 16 and the high current output contacts 96 and 98 of the probe/charger receptacle 24, the high current output contact 104 of the DLC receptacle 26, and the low current power contact 88 of the LED socket 86. The LED 28 thus illuminates, as shown in FIG. 9, and provides the operator and other observers with a visual indication that the device 10 is powered on (i.e., that the control relay 20 is latched and that a current path exists between the battery 16 and the receptacles 24 and 26).

Next, the operator engages in a series of one or more steps that involve establishing various different electrical connections between the device 10 and the target automobile with the goal of providing electrical power to the odometer of the automobile. The particular steps that are carried out, and the order in which those steps are carried out, will depend on a number of factors, including, but not limited to, the type of automobile involved, the operator's familiarity with the electrical system of the target automobile, and the extent to which the target automobile's electrical system has been damaged.

For example, if the operator knows, from previous experience or from consulting a wire diagram of the automobile's electrical system, that a particular component of the target automobile's electrical system (e.g., the automobile's computer, ignition, instrument cluster, etc.) does not need to be provided with electrical power in order for the odometer of the automobile to be activated, the step that involves providing power to that particular system component can be omitted. Conversely, if the operator has no previous knowledge of the target automobile's electrical system and does not consult a wire diagram, the operator will generally have to progress through a generic, predetermined series of connective steps, some of which may not be necessary for providing power to the odometer of the target automobile.

It is contemplated that a booklet, manual, or database, in paper or electronic form, will be compiled that details the particular steps that are necessary (and excludes the steps that are not necessary) for effectively using the device 10 to activate the odometers of various different makes, models, and years of automobiles. For example, an operator who wishes to activate the odometer of a 2003 Honda Accord would simply consult the section of the devices booklet that describes an operating procedure for using the device 10 on that particular type of automobile, and would follow the step-by-step instructions set forth therein. An operator with no previous knowledge of an automobile's electrical system would thereby be able to conveniently and effectively operate the device 10 without wasting time performing unnecessary steps. For the sake of completeness, however, the entire generic series of steps that an operator with no knowledge of a target automobile's electrical system may have to perform in order to activate the odometer of the automobile will now be described.

Figure 6:
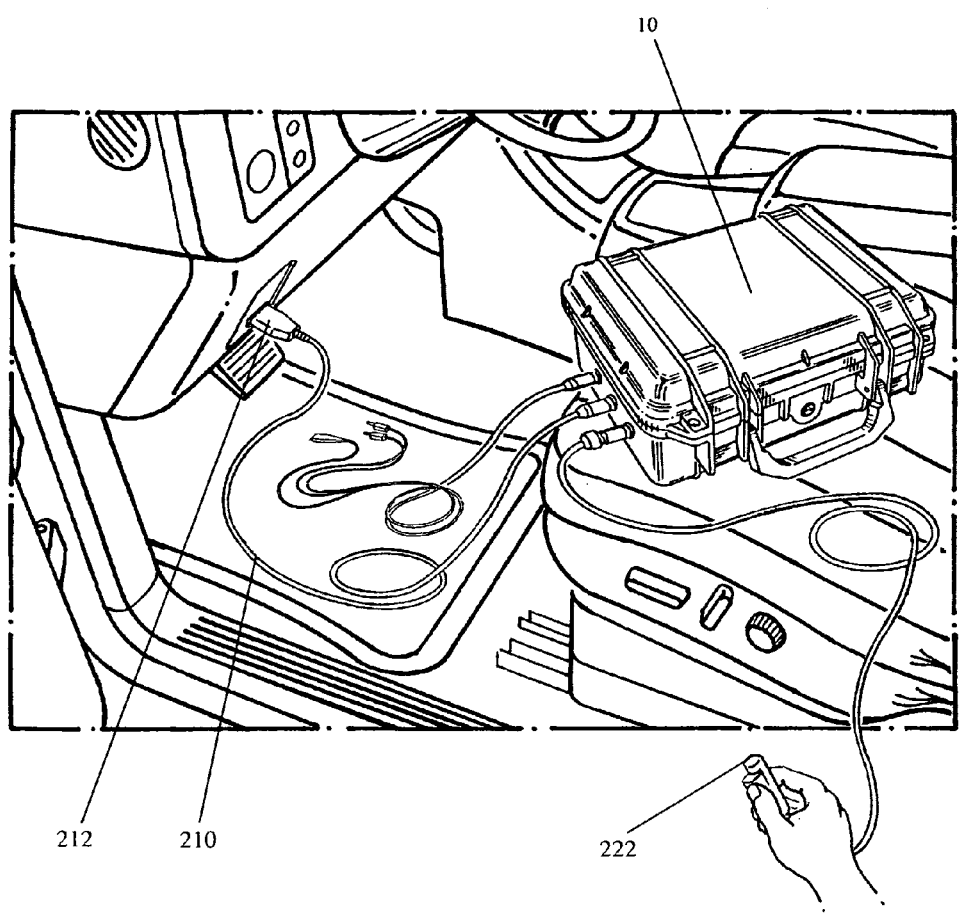
FIG. 6 is a perspective view illustrating the preferred embodiment of the first step of the inventive method with the inventive device connected to the DLC port of an automobile.
Figure 10:
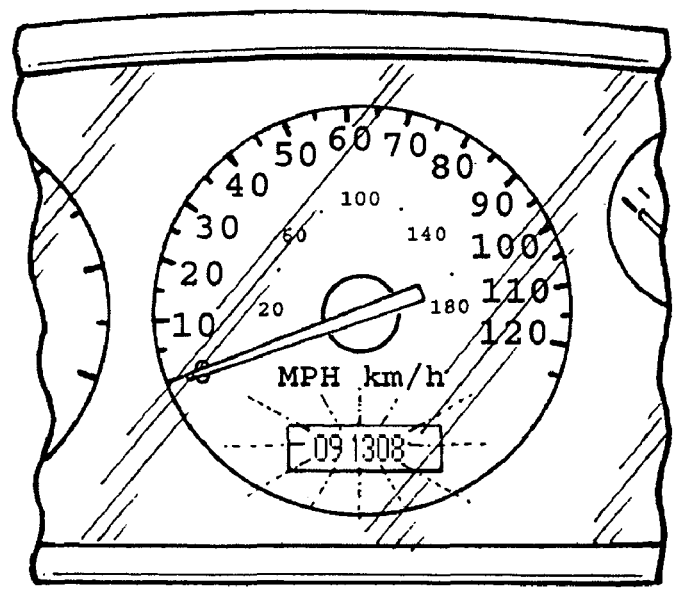
FIG. 10 is a front view illustrating the activated odometer of an automobile.

Referring now to FIGS. 1 and 6, the operator will generally first connect the DLC plug 212 of the DLC cable 210 to the DLC port of the automobile, which is typically located in the driver's compartment, below the steering column of substantially all passenger automobiles manufactured after 1996. An electrical connection is thereby established between the positive high current output contact 104 of the device's DLC receptacle 26 and the power pin of the automobile's DLC port, and between the negative high current output contact 106 of the device's DLC receptacle 26 and the ground pin of the automobile's DLC port. Thus, unlike traditional diagnostic devices, which receive electrical power and data from an automobile's computer via connection to the automobile's DLC port, the device 10 instead applies a positive voltage to the power pin of the DLC port and thereby delivers (i.e., back-feeds) electrical power from the battery 16 of the device 10 to the computer of the automobile, as well as to components of the automobile's electrical system that are electrically connected to the computer (i.e., any electrical components that normally receive power via the automobile's computer when the computer is receiving power). If the odometer of the vehicle is resultantly activated as shown in FIG. 10 (i.e., if providing power to the target automobile's computer is all that is necessary to activate the odometer, and if there is no damage to the automobile that otherwise prevents the odometer from being activated), the operation is complete and the operator or another individual can photograph or otherwise record the mileage displayed by the odometer.

Alternatively, if there is an electrical short in the automobile's computer or in any of the automobile's electrical components that draw electrical power through the computer (e.g., if there is a short circuit in the computer resulting from collision, fire, flooding, or other damage to the automobile), the application of battery 16 power to the power pin of the automobile's DLC port via the DLC cable 210 will result in an overcurrent condition (i.e., a current draw above the predetermined fault current described above) in the load supply circuit 12 of the device 10. The increase in current drawn from the battery 16 by the load supply circuit 12 thereby causes an immediate and significant current drop in the fault protection circuit 14 of the device 10 to a level that is below the holding current of the control relay 20 (described above). The control relay 20 thus unlatches, and the electrical connection between the high current input terminal 54 of the control relay 20 and the high current output terminal 56 of the control relay 20 is terminated. Battery 16 power to the probe/charger receptacle 24, the DLC receptacle 26, and the LED 28 is thereby interrupted, and the device 10 is effectively shut off. The extinguishing of the LED 28 indicates to an observer that a short circuit is present in the automobile's computer or related electrical components, and that the device 10 has shut down as a result. The immediate shutdown of the device 10 in response to a short circuit in the automobile's electrical system thus prevents, or at least mitigates, electrical damage to the components of the device 10 and to the components of the automobile's electrical system that could otherwise result from a persistent overcurrent condition.

If connecting the device 10 to the DLC port of the automobile did not result in activation of the automobile's odometer and did not cause the device 10 to shut down (i.e., if no short circuit was detected in the automobile's computer or related components and the LED 28 of the device 10 thus remains illuminated), the operator leaves the device 10 connected to the DLC port of the automobile with battery power being provided to the automobile's computer and related components. If connecting the device 10 to the DLC port of the automobile caused the device 10 to shut down (i.e., if a short circuit was detected in the automobile's computer or related electrical components and the LED 28 of the device 10 was thereby extinguished), the operator disconnects the DLC plug 212 from the DLC port of the automobile and again depresses the trigger switch 226 of the handheld trigger 222 in order to activate the device 10 in the manner described above. In both situations, the operator proceeds to the next step.

Figure 7:
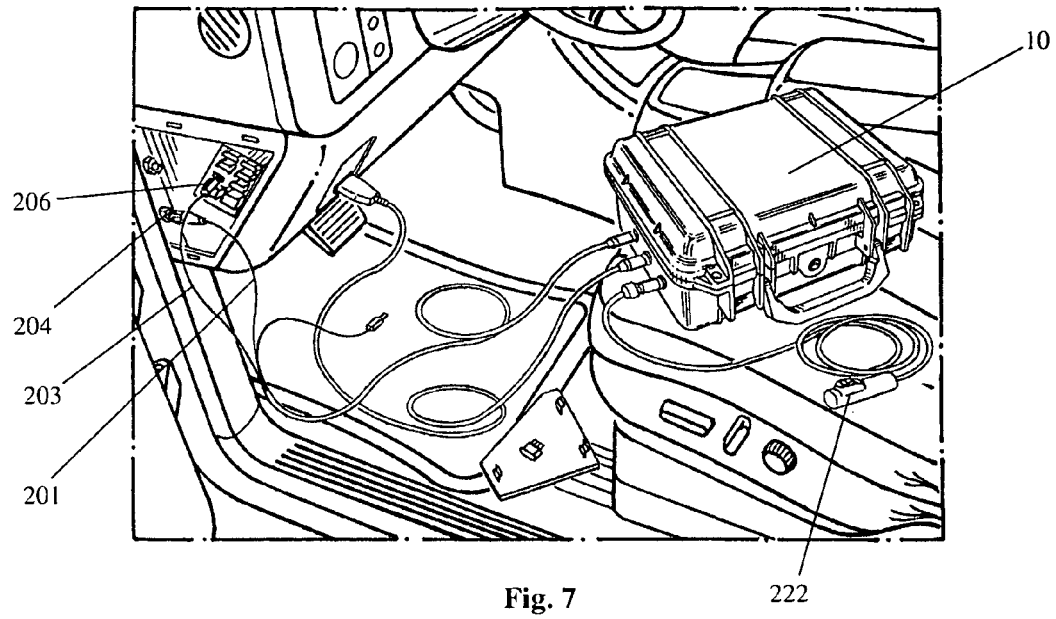
FIG. 7 is a perspective view illustrating the preferred embodiment of the second step of the inventive method with the inventive device connected to the instrument cluster fuse socket of an automobile.

Next, referring to FIG. 7, the operator opens the fuse panel of the target automobile and connects the probe 204 of the grounded lead 201 to any suitably grounded conductive surface, such as the automobile's metal frame. The operator then locates the instrument cluster fuse (sometimes also labeled "instrument," "cluster," "clstr," "gauge(s)," "illumination," "illum," or some variant thereof, as will be recognized by those skilled in the art) of the fuse panel and removes the fuse from its socket, if one is present. The operator then applies the probe 206 of one of the hot leads 203 to one or both terminals of the vacant fuse socket, thereby applying battery power to the automobile's instrument cluster and to any other of the automobile's electrical components that normally draw power from the instrument cluster circuit. If the fuse panel is damaged, it is contemplated that the operator can alternatively apply the hot probe to the wiring harness connector of the fuse panel. If the odometer of the vehicle is resultantly activated as shown in FIG. 10 (i.e., if providing power to the target automobile's instrument cluster, either alone or in combination with providing power to the automobile's computer, is all that is necessary to activate the odometer, and if there is no damage to the automobile that prevents the odometer from being activated), the operation is complete and the operator or another individual can photograph or otherwise record the mileage displayed by the odometer.

Alternatively, if there is an electrical short in the automobile's instrument cluster circuit or in any of the automobile's electrical components that normally draw electrical power from the instrument cluster circuit, the application of battery power to the instrument cluster fuse socket of the automobile will result in an overcurrent condition in the load supply circuit 12 of the device 10. Such an overcurrent condition will cause the current in the fault protection circuit 14 of the device 10 to fall below the holding current of the control relay 20 coil. The device 10 will therefore shut down in the manner described above, thereby preventing or mitigating electrical damage to the components of the device 10 and the electrical system of the automobile.

If connecting the device 10 to the instrument cluster fuse socket of the automobile caused to the device 10 to shut down (i.e., if a short circuit was detected in the automobile's instrument cluster circuit or related electrical components and the LED 28 of the device 10 was thereby extinguished), the operator disconnects the probe 206 of the hot lead 203 from the instrument cluster fuse socket and again depresses the trigger switch 226 of the handheld trigger 222 in order to activate the device 10 in the manner described above.

If connecting the device 10 to the instrument cluster fuse socket of the automobile did not result in activation of the automobile's odometer and did not cause the device 10 to shut down (i.e., if no short circuit was detected in the automobile's instrument cluster circuit or related components and the LED 28 of the device 10 thus remains illuminated), the operator leaves the device 10 connected to the instrument cluster fuse socket with battery power being provided to the automobile's instrument cluster circuit and related components.

Figure 8:
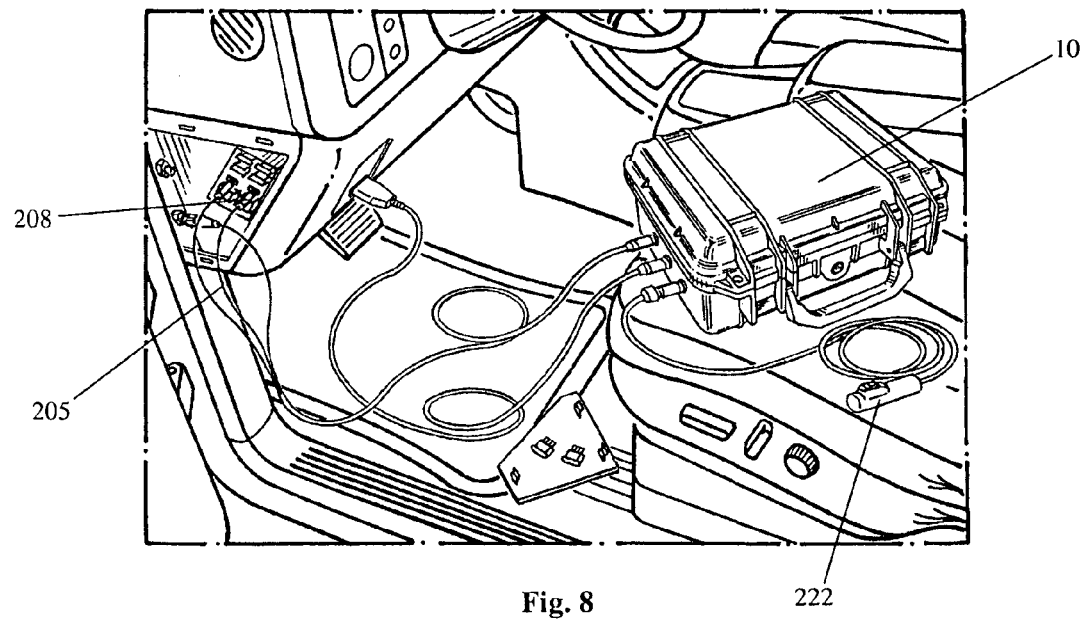
FIG. 8 is a perspective view illustrating the preferred embodiment of the third step of the inventive method with the inventive device connected to the ignition fuse socket of an automobile.

Next, referring to FIG. 8, the operator locates the ignition fuse (typically labeled "ignition," "IG," or some variant thereof as will be recognized by those skilled in the art) in the fuse panel of the automobile and removes the fuse from its socket, if there is one present. If the vehicle has more than one ignition fuse (usually corresponding to different ignition switch positions), the operator first removes the lowest sequentially numbered fuse (e.g., "IG1" if there is an "IG1" and an "IG2"). The operator then applies the probe 208 of one of the hot leads 205 to the vacant fuse socket, thereby applying battery power to the automobile's ignition circuit and to other of the automobile's electrical components that normally draw power from the ignition circuit. If the odometer of the vehicle is resultantly activated as shown in FIG. 9 (i.e., if providing power to the target automobile's ignition, either alone or in combination with providing power to either or both of the automobile's computer and instrument cluster circuit as described above, is all that is necessary to activate the odometer, and if there is no damage to the automobile that prevents the odometer from being activated), the operation is complete and the operator or another individual can photograph or otherwise record the mileage displayed by the odometer.

Alternatively, if there is an electrical short in the automobile's ignition circuit or in any of the automobile's electrical components that normally draw electrical power from the ignition circuit, the application of battery power to the ignition fuse socket of the automobile will result in an overcurrent condition in the load supply circuit 12 of the device 10. Such an overcurrent condition will cause the current in the fault protection circuit 14 of the device 10 to fall below the holding current of the control relay 20. The device 10 will therefore shut down in the manner described above, thereby preventing or mitigating electrical damage to the components of the device 10 and the electrical system of the automobile.

If there is more than one ignition fuse in the fuse panel of the automobile and the odometer of the automobile was not activated by the above steps, the operator repeats the above-described process of applying a hot probe to a fuse socket for each of the ignition fuses until the odometer is activated or until all of the ignition fuses have been exhausted. If more than two hot probes have to be connected to the fuse panel simultaneously (i.e., for providing power to more than two of the automobile's circuits through the fuse panel), the operator can utilize splitters or Y-connectors (described above) for connecting two or more probes to one or each of the probe leads 203 and 205. For example, if the target automobile has two ignition fuses and the operator has already connected one probe to the instrument cluster fuse socket and another probe to a first of the ignition fuse sockets without successfully activating the odometer and without detecting a short circuit in the automobile, the operator can connect a Y-connector and an additional probe to one of the probe leads to facilitate an additional electrical connection between the device 10 and the fuse socket of the hypothetical second ignition fuse.

If, at anytime while the device is powered on, the active shock sensor 34 (see FIG. 1) detects movement of the device 10 (i.e., if the case is moved while the device 10 is powered on), the shock sensor 34 will send a pulse of electrical current from its output contact 80 to the low current trigger controlled input 70 of the trigger module 32. The trigger module 32 is thereby signaled to toggle to standby mode, resulting in the opening of the internal electrical connection between the positive and negative trigger controlled outputs 64 and 66 of the trigger module 32. Current flow to the coil of the control relay 20 will then cease, thus causing the control relay 20 to unlatch and shut down the device 10 (i.e., current will no longer flow to the probe/charger receptacle 24 or to the DLC receptacle 26). Thus, if the case is moved while the probe leads 200 are still connected to the device 10 and the probes 204, 206, and 208 are hot, and the probes 204, 206, and 208 are thereby accidentally brought into contact with a delicate conductive surface, such as the metal exterior of an automobile with an expensive finish, the immediate deactivation of the device 10 by the shock sensor 34 upon movement will prevent or mitigate electrical damage to the conductive surface that could otherwise result from electrical arcing from or between the probe leads.

Still referring to FIG. 1, the 10 A slow blow circuit breaker 18 allows the load supply circuit 12 of the device 10 to operate at load current levels in excess of the amperage rating of the circuit breaker 18 for a finite, relatively short period of time (~1 min) before the circuit breaker 18 trips and interrupts the current in the load supply circuit 12, thereby shutting down the device 10. Most loads that the device 10 will be connected to during normal operation typically draw between 5 A and 15 A, and an operator will generally not be required to leave the device 10 connected to any load long enough for the circuit breaker 18 to trip. If, however, an operator unintentionally leaves the device 10 connected to a relatively large load (i.e., 10 A-30 A) for an extended period of time (e.g., if the operator becomes distracted and steps away from the device 10) the circuit breaker 18 will trip and cause the device 10 to shut down. The circuit breaker 18 thus prevents unintentional depletion of the device's battery 16 as well as circuit damage that could otherwise result from excessive heat buildup in the components of the device or the automobile.

Additionally, the circuit breaker 18 acts as a back-up shut down mechanism if there is a fault in the current-limiting circuit 30. For example, if the device 10 is connected to a load in which there is a short circuit, and if there is a fault in the current-limiting circuit 30 (e.g., a short) that prevents the current-limiting circuit 30 from effectively limiting the current in the fault protection circuit 14 as described above, the circuit breaker 18 will only allow the resulting overcurrent condition in the load supply circuit 12 to persist for a relatively short, finite amount of time before the circuit breaker 18 trips and shuts down the device 10. The circuit breaker 18 would, in the example, thereby mitigate electrical damage that could otherwise result if the overcurrent condition were allowed to persist unabated.

Figure 11:
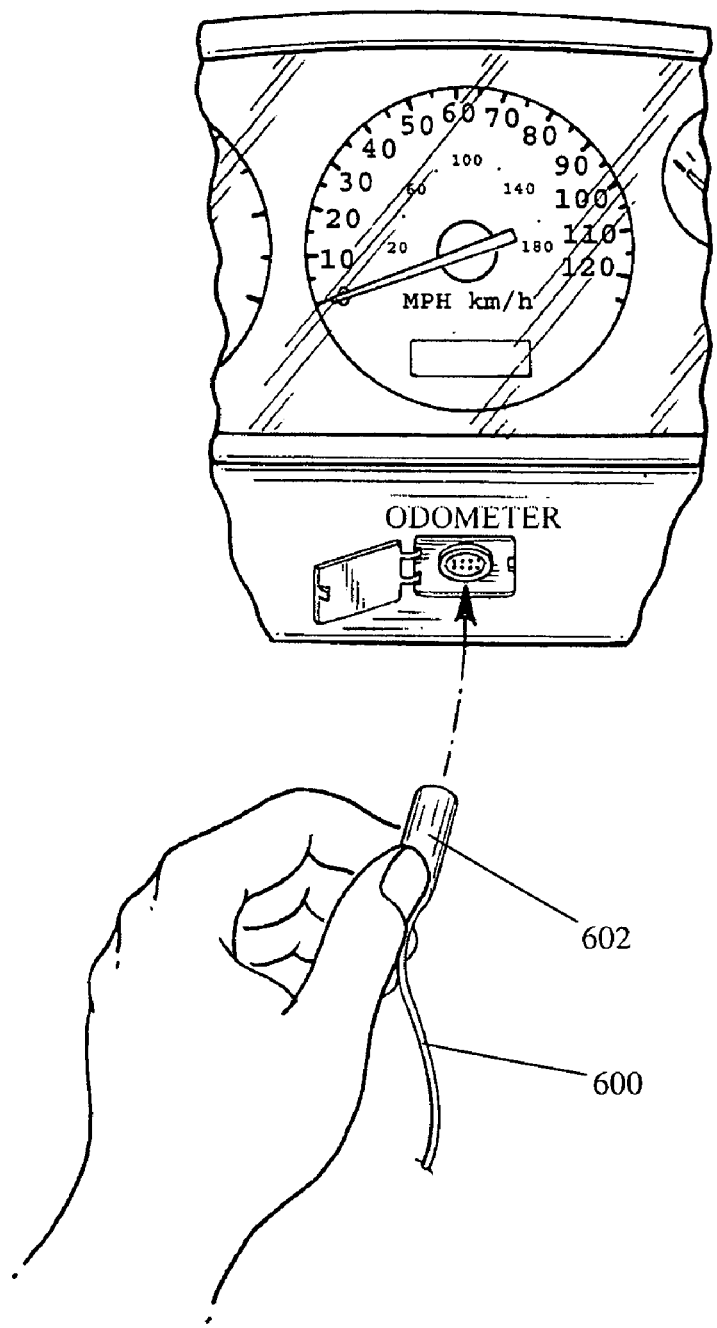
FIG. 11 is a front view illustrating an alternative embodiment of the inventive method with the inventive device being connected to an odometer port of an automobile.

In addition to the method steps described above, it is further contemplated that, in the case of a target automobile having a specialized receptacle or a dedicated DLC line that is electrically connected directly to either the automobile's instrument cluster or to the automobile's electronic odometer, the device 10 can be electrically connected to the specialized receptacle or dedicated DLC line via a suitable cable 600 and connector 602 as shown in FIG. 11, or via conventional DLC connection as shown in FIGS. 6-8, respectively, in a manner similar to the DLC port and fuse socket connections described above. The device 10 would then be operated in a substantially identical manner to that described above for providing power directly to the instrument cluster or odometer of the automobile through the specialized receptacle or dedicated DLC line, and for subsequently interrupting power to the instrument cluster or odometer in the case of an electrical short.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. A device for activating an electronic odometer of a vehicle without using a power source residing on the vehicle, the device comprising:
   (a) an auxiliary electrical power source;
   (b) a load circuit electrically connected to the auxiliary power source, the load circuit comprising:
      i. at least one power output connecting the auxiliary power source to the odometer; and
      ii. a control relay electrically connected in series intermediate the auxiliary power source and said at least one power output for opening and closing an electrical connection between the auxiliary power source and said at least one power output in response to a control input;
   (c) a fault protection circuit electrically connected to the auxiliary power source and electrically in parallel with the load circuit, the fault protection circuit comprising:
      i. a current-limiting circuit for limiting the current in the fault protection circuit to a predetermined maximum value; and
      ii. a trigger module electrically connected in series intermediate the current-limiting circuit and the control relay for providing the control input to the control relay in response to a trigger input.

2. The device in accordance with claim 1, wherein the current-limiting circuit comprises a resistive element that is electrically in parallel with a capacitive element.

3. The device in accordance with claim 2, wherein the resistive element is a resistor.

4. The device in accordance with claim 2, wherein the resistive element is a potentiometer.

5. The device in accordance with claim 2, wherein the capacitive element is a capacitor.

6. The device in accordance with claim 1, wherein said at least one power output comprises a data link connection receptacle connecting the auxiliary power source to the odometer through a data link connection port of the vehicle.

7. The device in accordance with claim 1, wherein said at least one power output comprises a probe receptacle connecting the auxiliary power source to the odometer through a fuse socket of the vehicle.

8. The device in accordance with claim 1, further comprising a manually operated trigger switch for providing the trigger input to the trigger module.

9. The device in accordance with claim 8, wherein the manually operated trigger switch is connected to the trigger module by a cable.

10. The device in accordance with claim 8, wherein the manually operated trigger switch wirelessly communicates with the trigger module.

11. The device in accordance with claim 1, further comprising a shock sensor for interrupting the electrical connection between the auxiliary power source and said at least one power output in response to movement of the device.

12. The device in accordance with claim 11, wherein the shock sensor provides the trigger input to the trigger module.

13. The device in accordance with claim 1, wherein the load circuit further comprises a circuit breaker for interrupting the electrical connection between the auxiliary power source and the power output if a current in the load circuit exceeds a predetermined value.

14. The device in accordance with claim 13, wherein the circuit breaker is a slow blow type circuit breaker.

15. The device in accordance with claim 1, further comprising a visual indication means for indicating that there is an electrical connection between the auxiliary power source and said at least one power output.

16. The device in accordance with claim 15, wherein the visual indication means is a light emitting diode (LED).

17. The device in accordance with claim 1, further comprising an auditory indication means for indicating that there is an electrical connection between the auxiliary power source and said at least one power output.

18. The device in accordance with claim 17, wherein the auditory indication means is a buzzer.

19. The device in accordance with claim 17, wherein the auditory indication means is an electronically generated tone.

20. The device in accordance with claim 1, wherein the device is housed in a portable case.

21. The device in accordance with claim 20, wherein the case is watertight.

22. A device connected to an electrical system of a vehicle for activating an electronic odometer of the vehicle without using a power source residing on the vehicle, the device comprising:
   (d) an auxiliary electrical power source;
   (e) a load circuit electrically connected to the power source, the load circuit comprising:
      i. a data link connection receptacle connecting the auxiliary power source to a data link connection port of the vehicle; and
      ii. a control relay electrically connected in series intermediate the auxiliary power source and the data link connection receptacle for opening and closing an electrical connection between the auxiliary power source and the data link connection receptacle in response to a control input;
   (f) a fault protection circuit electrically connected to the auxiliary power source and electrically in parallel with the load circuit, the fault protection circuit comprising:
      i. a current-limiting circuit for limiting the current in the fault protection circuit to a predetermined maximum value; and ii. a trigger module electrically connected in series intermediate the current-limiting circuit and the control relay for providing the control input to the control relay in response to a trigger input;

(g) a shock sensor for interrupting the electrical connection between the auxiliary power source and the data link connection receptacle in response to movement of the device; and (h) a visual indication means for indicating that there is an electrical connection between the auxiliary power source and the data link connection receptacle.

* * * * *